N. WEILER.
DISK GANG PLOW.
APPLICATION FILED DEC. 6, 1910.
1,054,885.
Patented Mar. 4, 1913.
3 SHEETS—SHEET 2.
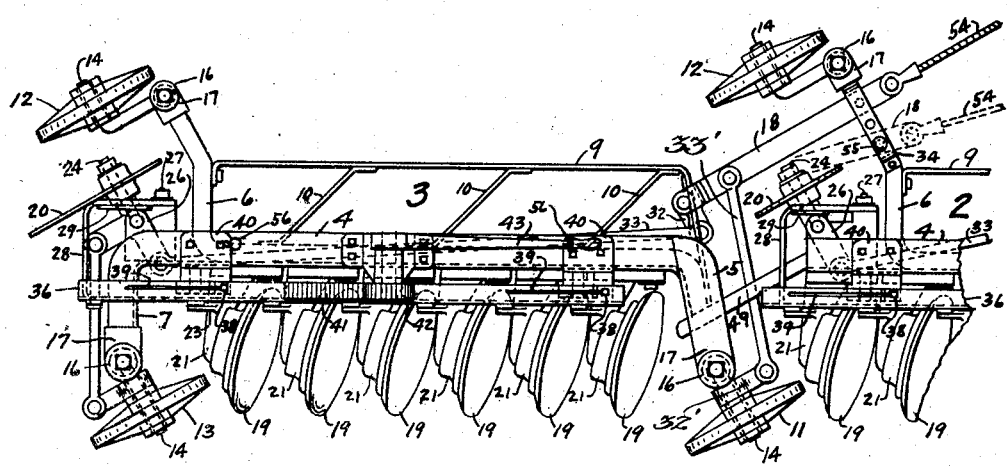
Fig. 3.
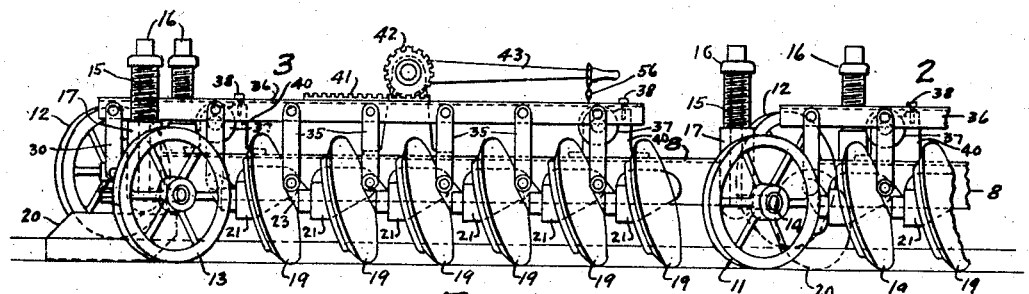
Fig. 4.
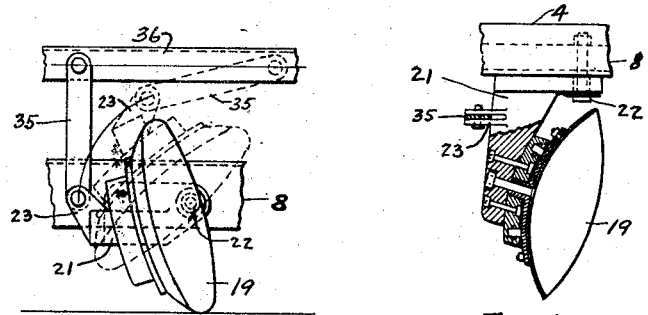
Fig. 5.
Fig. 6.
Witnesses
Harry W. Mool
Wm. P. Drake
Inventor
Nicholas Weiler,
By Millard Eddy, Attorney

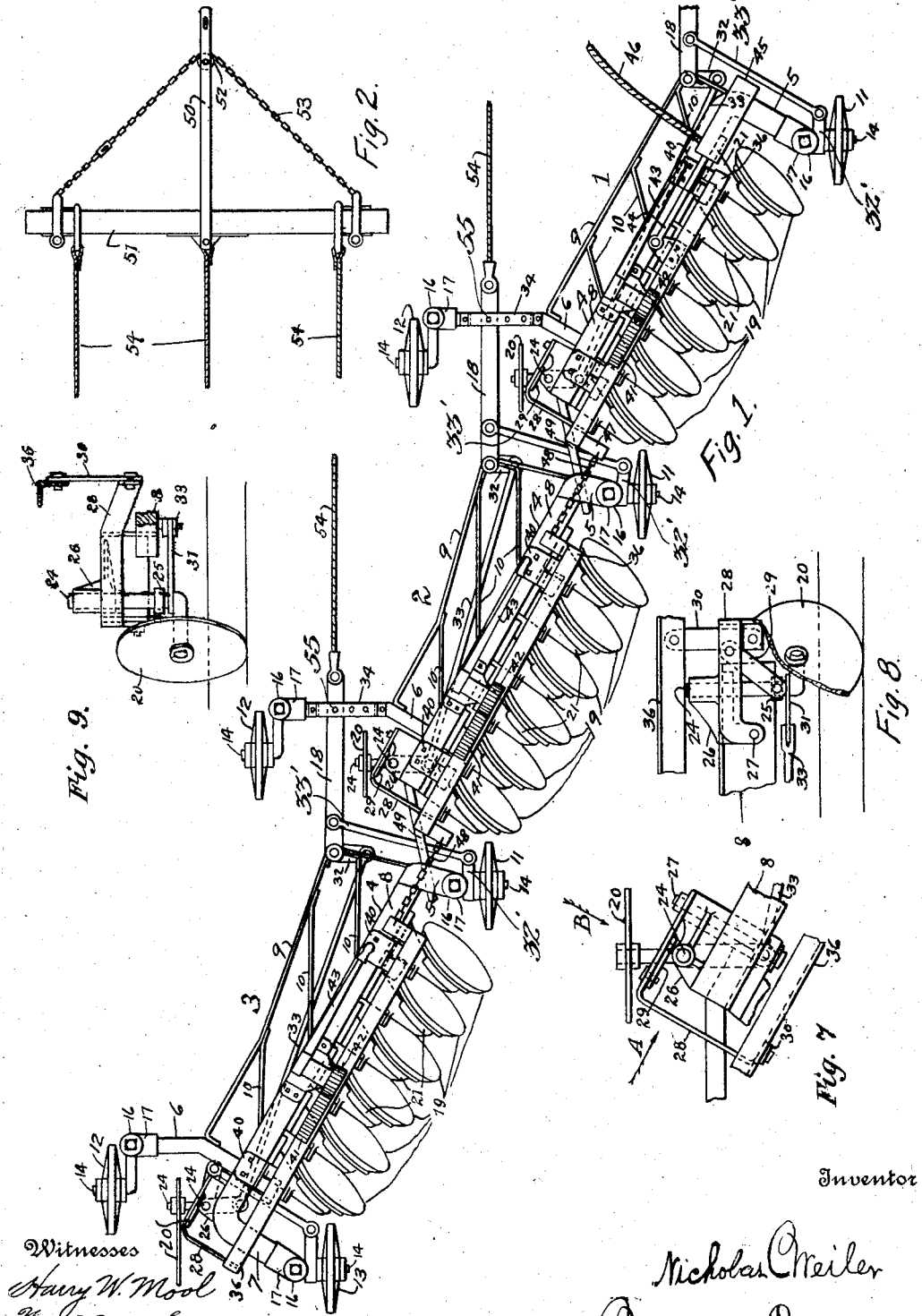

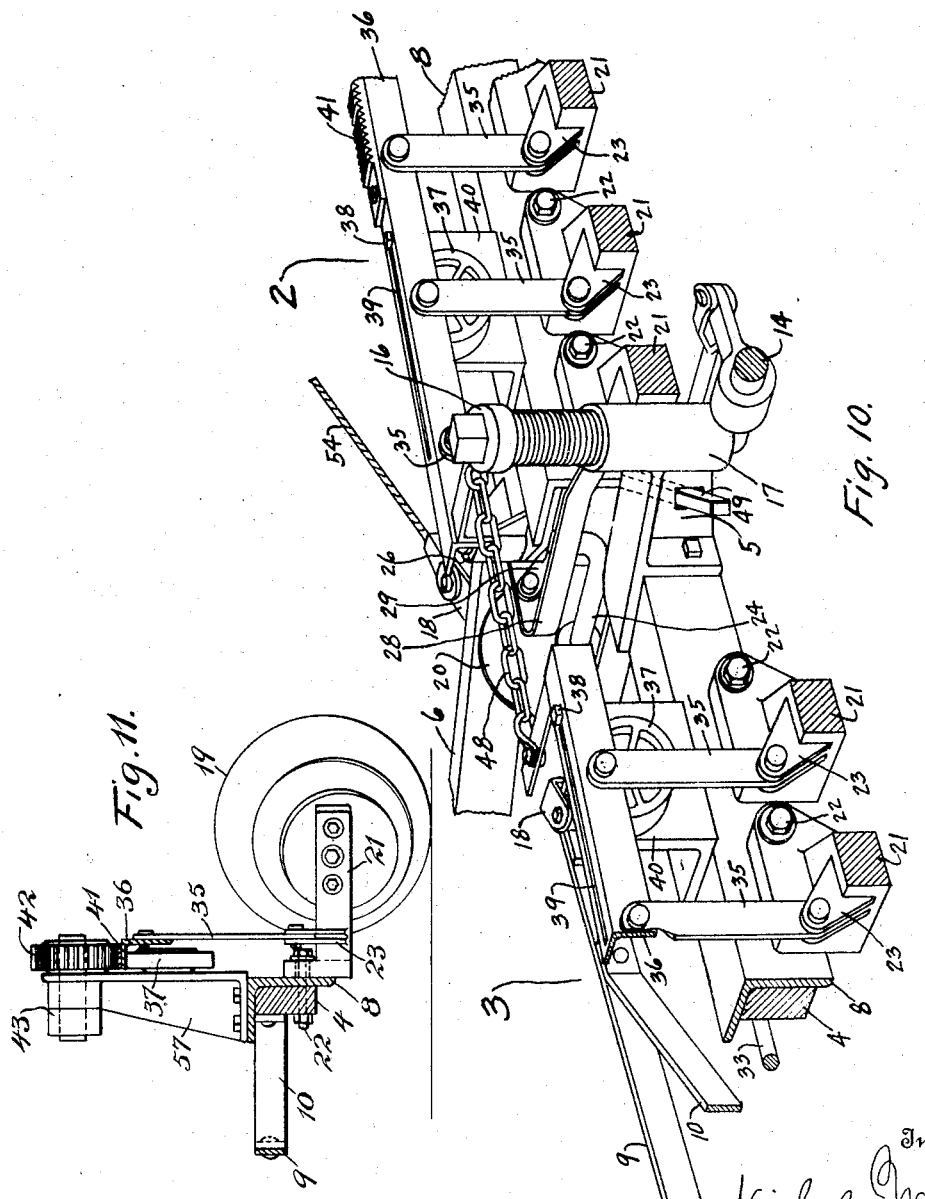

UNITED STATES PATENT OFFICE.

NICHOLAS WEILER, OF FORT COLLINS, COLORADO, ASSIGNOR OF ONE-HALF TO B. L. SHRADER, OF FORT COLLINS, COLORADO.

DISK GANG-PLOW 1,054,885.     Specification of Letters Patent.     Patented Mar. 4, 1913.

Application filed December 6, 1910. Serial No. 595,860.

*To all whom it may concern:*

Be it known that I, NICHOLAS WEILER, of Fort Collins, in the county of Larimer and State of Colorado, have invented certain new and useful Improvements in Disk Gang-Plows, which improvements are described in the following specification and are illustrated by the accompanying drawings.

The invention relates to gang plows of that kind in which several gangs of plow disks are united in a single plow, drawn by a traction engine or motor.

The objects of the invention are to lift the disks of such a plow out of the ground at the end of the field without raising the gang frames; and to hold them clear of the ground, when not in use; to raise and lower the plow disks, relatively to the gang frames by which they are carried; to raise and lower the gang frames in a superior manner; to arrange the plow gangs, when not in use, to track in a straight line behind the engine; to lock the plow disks automatically in position, when lowered into the ground; to engage successive gangs with each other in a special manner; to guide each of the gangs of such a plow automatically to its proper position, relative to the plowed ground, and hold it there, while at work; and in general to produce a superior plow of the kind above specified. In accomplishing these objects I provide the plow gangs with rudders, which are adapted to run in the plowed ground, and attach the plow disks to the gang frames by means of pivoted brackets.

The best manner in which I have contemplated applying the principles of the invention, is illustrated by said drawings; in which—

Figure 1 is a plan of a disk gang plow, which is constructed in accordance with these principles, and shown in working position. Fig. 2 is a like view of the draft mechanism of the same plow, on a reduced scale. Fig. 3 is an enlarged plan of a portion of a like plow in a like position. Fig. 4 is a side elevation of Fig. 3. Figs. 5 to 9 inclusive are enlarged details. Fig. 10 is a detail perspective view of the front half of one gang and the rear half of its preceding gang, parts being broken away to show construction. Fig. 11 is a detail transverse section across the center of a gang.

In Figs. 1, 3 and 4, the several gangs are designated generally, in their order from front to rear of the plow, by the numerals 1, 2 and 3 respectively. In general features these gangs are of a single type and the description of any one gang will be equally applicable to each of the others.

The frame of each gang comprises a horizontal bent bar, having a middle straight portion 4. The frame of the rear gang 3 has a forward lateral branch 5 and two divergent rear branches 6 and 7. The forward lateral branches 5 of the intermediate gangs may be integral or bolted to the respective brackets 17 hereinafter described and are secured to the straight portions 4 which carry such branches. The rear branch 7 and its wheel are found only upon the frame of the rear gang, the single rear branch 6 being employed in all of the other gangs and extending from the opposite side of the straight portion 4 from that on which the forward branch 5 is positioned. The middle straight portion 4 of this bar is reinforced by a straight angle iron 8, which is shown in the perspective view, Fig. 10. The frame also comprises a horizontal bent bar 9, which is united with bar 4 by bolts and by cross braces 10. The rear frame rides on three wheels 11, 12 and 13, and the other frames upon the two wheels 11 and 12, which wheels support the free ends of said branches respectively, by means of hinged connections, consisting in each instance of a bent rod or axle 14, having a vertical arm 15, fitted with a loose sleeve cap, 16, which is provided with an external screw thread and works in an internally threaded vertical bracket 17, rigidly mounted upon the end of its respective branch of the bent bar 4 of the same gang beam. By a bend in the axles of said left wheels 12, the latter are caused to trail always behind their brackets 17; while the right wheels, 11, are caused to run uniformly in the desired direction by means of draft rods, 18, which are pivoted to the gang frames respectively, and are connected with the axles of those wheels by links 33′ and levers 32′. The lateral swing of these draft rods 18 is limited by stops 34 on branches 6 of the gang frame, and by vertical stop pins 55, which are removably inserted through stops 34. These pins may at the same time be inserted through vertical holes in bars 18, whenever it is desired to fasten those bars in their extreme positions toward the right, shown in Fig. 3.

To the described gang frame are attached at suitable intervals a suitable number of plow disks 19. The manner of this attachment is shown in detail in Figs. 5 and 6, which are an elevation and a plan respectively of portions of the gang, including one of these disks. This disk, being of any ordinary or proper form, is rotatably mounted on a bracket 21, which is pivoted to the side of the main beam, that is to say, to the angle-iron 8, by pin 22. Being mounted in this manner, the disk can be lowered to the full-line position shown in Figs. 1, 3, 4, 5 and 6, or raised to the position shown in dotted lines in Fig. 5, or even to a higher position, by a pivotal movement of this bracket, as occasion may require. For the purpose of raising and lowering this bracket, as described, the latter is provided with a lug 23, to which may be attached a link 35.

To the plow gang, and preferably to the frame of the gang, a guide or rudder is similarly attached, consisting preferably of a rotary disk 20, which is shown in connection with gang 2 in Figs. 1, 3 and 4, and in detail in Figs. 7, 8 and 9. Fig. 7 is a plan of a portion of the gang, including rudder 20, while Figs. 8 and 9 are elevations of Fig. 7. In an alternative form this rudder may be angular, as shown in connection with gang 3 in Figs. 1 and 3. Rudder 20 is provided with a bent axle, having a vertical portion 24, having a fixed collar 25. The vertical portion of this axle is rotatable in a sleeve bracket 26, which is fastened to angle-iron 8 by a bolt or pin 27. A lifting bar 28 is pivoted to bracket 26 by the same pin 27, and is connected with collar 25 by link 29; and to the end of this bar 28, is attached a link 30. For the purpose of giving direction to the rudder, the same is connected with the draft-bar 18 in a parallel motion, consisting of a rigid horizontal lever arm 31 on axle 24, an arm 32 of said draft-bar, and a link 33, connecting said arms. For the purpose of raising the plow disks and the rudders out of the ground, the before-mentioned links 30 and 35 are attached to a horizontal reciprocable bar, preferably of angle-iron, 36. This bar is supported on rollers 37, and is held in position thereon by screws 38, which work in slots 39 of said bar, and take into brackets 40 on the gang frame, part 8. The same bar is also provided with a rack 41, engaged by a pinion 42, which is mounted on the gang frame, part 8, and is operated by the lever handle 43. This handle may be held in the position shown or in the reversed position by stops or catches 56.

The reciprocable bars 36 of the several gangs may be impelled forward in unison by connection with the piston-rod 44 of a steam cylinder 45, which is mounted on gang 1 and is supplied with steam from the boiler of the traction engine through a flexible steam pipe 46. This connection is made by fastening the piston rod 44 to a bracket 47 on the reciprocating bar 36 of gang 1 and by connecting the successive reciprocating bars of the different gangs with each other by chains 48.

Each of the gangs 2 and 3 engages the gang before it by means of a horizontal supporting bar 49, whose forward end is bolted to the beam of the preceding gang in the position shown, and whose rear end portion plays loosely in a horizontal slot through the arm or branch 5 of the following gang.

The draft mechanism, which is shown in Figs. 1 and 2, comprises a draw-bar 50, which is pivoted to the middle of a cross-bar 51, a grooved pulley 52, which is carried by this cross-bar, a chain 53, which is attached to the end portions of this cross-bar and runs over said pulley, together with cables 54, which are attached to draft rods 18 of each of the gangs, respectively, and to said cross-bar.

Such being the construction of my improved gang plow, its operation accomplishes all of the above-mentioned objects of the invention.

By turning with a wrench the screw cap 16 in post 17, the operator raises or lowers the gang frames as may be required. The described lever handles, being turned to a horizontal position in either direction, and acting through wheel 42, rack 41, reciprocating bar 36, links 35 and pivoted brackets 21, raise and lower the disks of each gang as may be desired, without raising or lowering the gang frames. The steam cylinder, with its contained piston, being operated from the engine, and acting through bars 36, chains 48, links 35 and brackets 21, similarly raises all said disks simultaneously, when necessary. The disks when lowered into the ground, are locked in position, being held down by links 35, as shown in Fig. 5. The disks are held up, clear of the ground, when not in use, by catching the lever handles 43 horizontally back. The gangs are guided to their proper positions, and held there, by the rudders 20, which run partly in the ground, as shown in Figs. 8 and 9. These rudders in turn are directed by the engine through draft rods 18, 18, 18, acting upon the pivoted rudder arm or axle 24 by arms 31 and 32 and links 33; and are raised and lowered in unison with the plow disks, by the same movements of the reciprocable bars 36, acting through mechanism shown in Figs. 7, 8 and 9. The gangs are arranged to track in line behind the engine in traveling by uncoupling the engine from the draw-bar 50, by coupling the same to the draft rod 18 of gang 1, by uncoupling the cables 54 from all the draft rods, by swinging by hand the draft rods of gangs 2 and 3 to the extreme right, as shown in dotted lines in Fig. 3, and by fastening said rods in that position by stop pins 55.

The special engagement of successive gangs by bar 49 not only brings a part of the weight of the preceding gang upon its successor, but prevents those two gangs from getting out of proper alinement with each other. At the same time the rudders not only guide the gangs but also serve as landsides, resisting the effort of the gangs to crowd away from the plowed ground.

Such being the construction and operation of my invention, I claim:—

1. A plow gang, comprising a gang frame; disk-carrying brackets, which are attached to said frame by pivots; a reciprocable bar, which is attached to said brackets by links; a rack and pinion, which are adapted to move said reciprocable bar longitudinally for the purpose of raising and lowering said disks by turning said brackets on said pivots.

2. A plow gang, comprising a gang frame, which is mounted on wheels, disk-carrying brackets, which are pivotally mounted on said frame, a rudder, which has a pivotal connection with said frame, a reciprocable bar, which is mounted on said frame, and means for raising and lowering said pivotally mounted disks and rudder by the longitudinal movement of said reciprocating bar.

3. A plow gang, comprising a gang frame, which is mounted on wheels, plow disks and a rudder, which have pivoting connections with said frame, a movable bar, which is mounted on said frame in operative connection with said disks and rudder, and means for operating said movable bar.

4. A plow gang, comprising plow disks, which are mounted upon the gang frame by movable brackets, a landside rudder, which is pivotally attached to said frame, and means for raising and lowering said pivoted disks and rudder simultaneously.

5. A gang plow, comprising gang frames which are mounted on wheels, plow-carrying brackets which are pivotally mounted on said frames, landside rudders which have pivotal connections with said frames respectively, reciprocable bars which are mounted on said frames respectively, are operatively connected with said rudders and brackets, and are flexibly connected with each other, means for operating said bars in unison, and guiding bars between successive gangs.

6. A plow gang, comprising a gang frame, a sleeve bracket on said frame, an axle having a vertical arm working in said sleeve bracket, a rudder on said axle, means for turning said vertical arm in said sleeve bracket, and steam-driven mechanism for raising and lowering said axle.

7. A plow gang, comprising a gang frame which goes on wheels, disks and rudders carried by said frame, a reciprocable bar which is mounted on said gang frame, and intermediate connecting mechanisms through which said disks and rudders are raised or lowered by said reciprocable bar.

In testimony whereof I hereunto subscribe my name in the presence of two witnesses.

NICHOLAS WEILER.

Witnesses:
 WILLARD EDDY,
 THOS. F. PAYTON.

---

Copies of this patent may be obtained for five cents each, by addressing the "Commissioner of Patents, Washington, D. C."